United States Patent

[11] 3,547,467

[72] Inventor Fredrick Pociask
       Detroit, Mich.
[21] Appl. No. 647,796
[22] Filed June 21, 1967
[45] Patented Dec. 15, 1970
[73] Assignee Eaton Yale & Towne Inc.
       Cleveland, Ohio
       a corporation of Ohio

[54] VEHICLE SAFETY APPARATUS
     25 Claims, 7 Drawing Figs.
[52] U.S. Cl. ..................................... 280/150,
       137/68, 251/57, 180/91
[51] Int. Cl. ..................................... B60r 21/00
[50] Field of Search........................... 280/150;
       137/68, 70; 73/(Inquired); 251/57; 60/26.1;
       180/91, 92; 293/(Inquired)

[56] References Cited
     UNITED STATES PATENTS
| | | | |
|---|---|---|---|
| 2,052,186 | 8/1936 | Mapes............................ | 137/68X |
| 2,374,200 | 4/1945 | Heigis............................ | 251/57X |
| 2,508,231 | 5/1950 | DeFrees......................... | 137/68 |
| 2,804,929 | 9/1957 | Plummer....................... | 137/67X |
| 3,188,011 | 6/1965 | Ternullo........................ | 251/57X |
| 3,260,272 | 7/1966 | Eckardt......................... | 137/68 |
| 2,649,311 | 8/1953 | Hetrick.......................... | 280/150 |
| 2,850,291 | 9/1958 | Ziccardi........................ | 280/150 |
| 2,883,206 | 4/1959 | Racine........................... | 180/91 |
| 3,197,234 | 7/1965 | Bertrand........................ | 280/150 |
| 3,312,431 | 4/1967 | Vogt............................... | 137/68 |
| 3,378,081 | 4/1968 | O'Reilly........................ | 137/70 |

Primary Examiner—Kenneth H. Betts
Attorney—Yount, Flynn & Tarolli

ABSTRACT: A vehicle safety apparatus includes an actuating mechanism operable to effect actuation of a safety device for protecting the occupant or occupants in the vehicle when a crash is occurring. The actuating mechanism comprises a valve means for controlling the communication between a reservoir of compressed gas and the safety device, which is preferably an inflatable crash restraint bag. The valve means has a valve member which is normally maintained in a first position in which it is effective to prevent communication between the compressed gas reservoir and the inflatable bag. The valve member is adapted to be moved from the first position toward a second position in which it will effect communication between the reservoir of compressed gas and the inflatable bag to cause inflation of the latter by a fluid actuating means in response to a vehicle crash occurring.

INVENTOR
FREDRICK POCIASK

BY Yount, Raney, Flynn and Tarolli
ATTORNEYS

INVENTOR
FREDRICK POCIASK

BY Yount, Ravey Flynn and Tarolli
ATTORNEYS 3,547,467

VEHICLE SAFETY APPARATUS

The present invention relates to safety apparatus for use in a vehicle, and more particularly to a vehicle safety apparatus having a safety device for protecting the occupant or occupants when actuated and an actuating mechanism for actuating the safety device when a crash or collision is occurring.

An important object of the present invention is to provide a new and improved vehicle safety apparatus of the character referred to above and in which the actuating mechanism includes a member normally maintained in a first position in which it is ineffective to cause actuation of the safety device, but which it is moved from its first position towards a second position in which it effects actuation of the safety device by a fluid actuating means when a collision is occurring.

Another object of the present invention is to provide a new and improved vehicle safety apparatus for protecting the occupant or occupants of the vehicle during a collision, and which includes a reservoir of compressed gas for actuating a safety device, such as an inflatable crash restraint bag, and a fluid actuatable valve member for controlling release of the compressed gas from the reservoir, the valve member being movable from a normal position in which it is effective to prevent release of the gas from the reservoir to a release position in which it effects release of the gas in the reservoir to actuate the safety device by a fluid actuating means in response to the vehicle being subjected to a force causing a deformation of vehicle during a collision.

A further object of the present invention is to provide a new and improved vehicle safety apparatus, as defined in the next preceding object, and wherein the fluid actuating means includes a crushable tube containing hydraulic fluid in communication with the valve member, the tube when crushed during a collision pressurizing the hydraulic fluid to effect movement of the valve member to its release position in which it effects actuation of the safety device.

A still further object of the present invention is to provide a new and improved vehicle safety apparatus, as defined in the penultimate preceding object, and in which the valve member is spring biased towards its release position, but is maintained in its normal position in opposition to the biasing force of the spring by hydraulic fluid contained in a container means, the container means including a frangible part which breaks upon being impacted during a collision to release the hydraulic fluid and enable the spring to move the valve member to its release position in which it effects actuation of the safety device.

Yet another object of the present invention is to provide a new and improved safety apparatus of the character referred to in the preceding objects, and in which the valve member is moved to its release position to effect actuation of the safety device by pressurized gas generated by exploding an explosive material.

The present invention also resides in certain novel constructions and and arrangement of parts, and other objects, novel characteristics and advantages of the present invention will be apparent from the following detailed description and in the accompanying drawing forming a part of this specification, and in which similar reference numerals designate corresponding parts throughout the several views of the drawing and in which.

Figure 1:
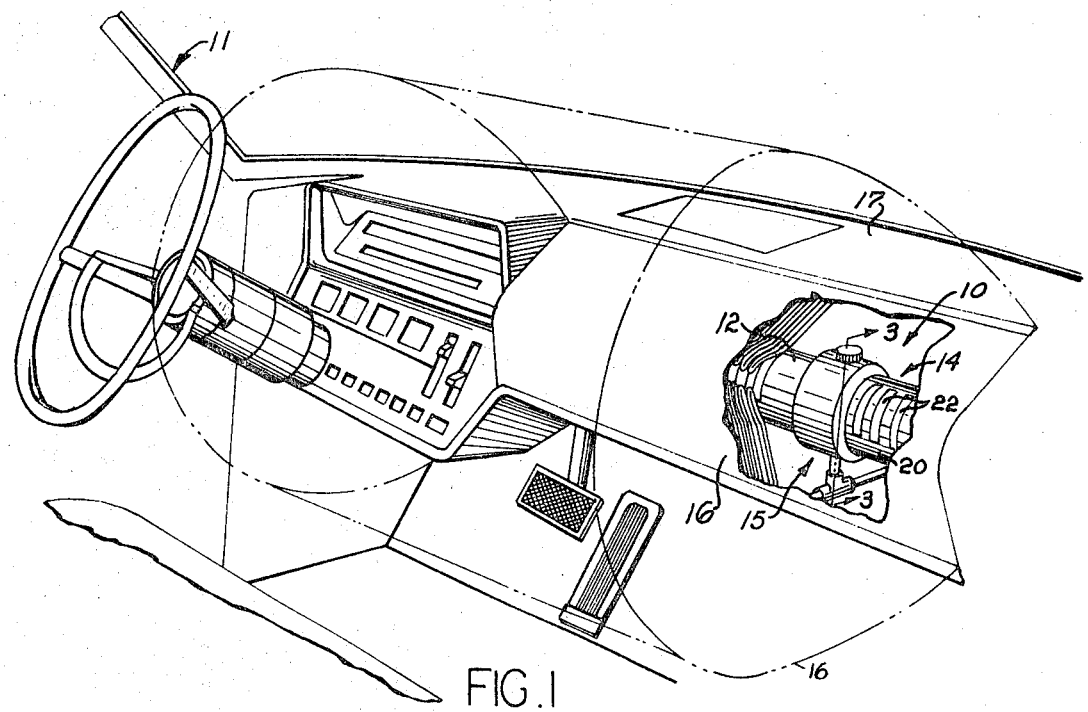
FIG. 1 is a schematic perspective view of an interior of an automobile and showing certain parts of one embodiment of the safety apparatus of the present invention.

The novel safety apparatuses of the present invention can be employed in various kinds or types of vehicles, but are particularly susceptible for use in automotive vehicles, and airplanes, and for the purposes of illustration are herein shown and described as being used in an automobile.

As representing one embodiment of the present invention, FIGS. 1—4 of the drawings show a safety apparatus 10 used in an automobile 11. The safety apparatus 10 comprises, in general, a container or reservoir 12 containing compressed gas, a safety device 14 which is adapted to be actuated when the compressed gas is released from the reservoir and a novel actuating mechanism 15 for controlling release of the compressed gas from the reservoir 12 to the safety device 14. The actuating mechanism 15, in the preferred embodiment, is operable to effect release of the compressed gas from the reservoir 12 only when a crash or collision is occurring.

The safety device 14 could be of any suitable form or type. Preferably, however, the safety device 14 comprises an inflatable crash restraint bag 16 mounted within the dashboard 17 of the automotive vehicle 11. The inflatable bag 16 is normally in a collapsed or folded position, as shown by the solid lines in FIG. 1, and is contoured so as to give the appearance of being a continuation of a dashboard 17. The bag 16 is secured to a cylindrical diffuser tube 20 mounted within the dashboard 17. The diffuser tube 20 is cylindrical and has a plurality of longitudinally spaced circumferentially extending slots 22 which communicate the interior of the diffuser tube 20 with the interior of the bag 16. Coaxially aligned with the diffuser tube 20 is the cylindrically shaped container 12 containing a supply of high pressure gas, such as nitrogen.

In accordance with the provisions of the present invention, a novel actuating mechanism 15 is provided for controlling release of the compressed gas from the container 12 to the bag 16 to cause inflation of the latter. The actuating mechanism 15 comprises a valve assembly 25 for controlling communication between the container 12 and the diffuser tube 20. The valve assembly 25 comprises an annular valve body or housing 26 having a generally central through opening or passageway 27 therethrough for communicating the interior of the container 12 with the interior of the diffuser tube 20. The valve body 26 at its left and right ends, as viewed in FIG. 3, includes cylindrical flange portions 26a and 26b which are slidably received in the adjacent end portions of the coaxially aligned container 12 and the diffuser tube 20, respectively. Alternately, flanges could be machined on the ends of the container 12 and the tube 20, if desired. The container 12 and the diffuser tube 20 can be secured to the flange portions 26a and 26b in any suitable manner, such as by welding or bonding.

The valve assembly 25 includes a valve means 30 for controlling release of the compressed gas from the container 12. The valve means 30 comprises a cylindrically shaped valve member 32 which is slidably received within the opening 27 of the valve body 26 and a two-piece retaining means or valve member 34 slidably received in a diametrically extending through opening 35 in the valve member 32. The valve member 32 when received in the opening 27 blocks communication between the container 12 and the diffuser tube 20. The valve member 34 is preferably of circular cross section and comprises an upper part 34a and a lower part 34b in abutting engagement with each other. The parts 34a and 34b at the upper end portions thereof are slidably received in radially extending through openings 37 and 38 at diametrically opposite locations in the valve body 26.

Figure 3:
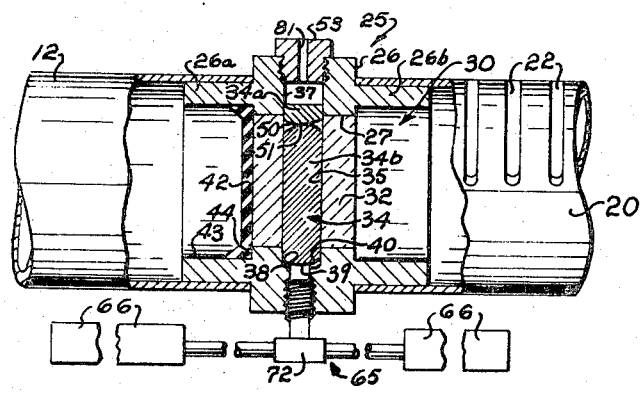
FIG. 3 is an enlarged fragmentary sectional view taken along approximately line 3—3 of FIG. 1.

The valve member 34 is vertically disposed and normally maintained in a normal or first position, as shown in FIG. 3, by the force exerted by the compressed gas in the container 12. This force urges the valve member 32 toward the right, the valve member 32 in turn urging the parts 34a and 34b of the valve member 34 against the side walls defining the openings 37 and 38. When in the normal position the upper part 34a of the valve member 34 is received in the opening 37 and the lower part 34b of the valve member 34 is received in the counterbore portion of the opening 38 to form a fluid receiving chamber 38a, and with the bottom or lower end 39 of the valve part 34b being in abutting engagement with a shoulder 40 defined by the bottom of the counterbored portion of the opening 38.

When the valve member 34 is in the normal position, as shown in FIG. 3, it is effective to hold the valve member 32 within the opening 27 of the valve body 26 and prevent escape of the compressed gas from the container 12 into the diffuser tube 20. A suitable, frangible circular seal 42 in sealing relationship with the inner sidewall 43 of the flange portion 26a and which abuts a shoulder 44 on the valve body is provided to prevent leakage of the compressed gas in the container 12 through the valve means 30.

Figure 4:
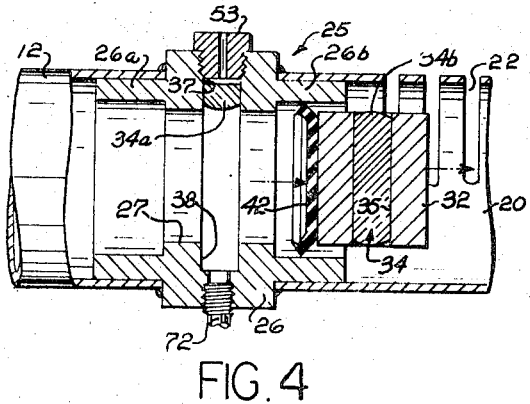
FIG. 4 is a fragmentary sectional view like that shown in FIG. 3 but showing certain parts thereof in different positions.

The valve member 34 effects actuation of the safety device 12 when moved from the normal position, as shown in FIG. 3, to a release or second position, as shown in FIG. 4. To this end, the dimension between the upper end 50 and the bottom 39 of the valve part 34b is slightly less than the diameter of the opening 27 in the valve body 26. When the valve member 34 is moved to the release position the upper end of the valve part 34a is in abutting engagement with an adjustably positionable stop 53 and the lower end 51 thereof is located substantially flush with the inner sidewall defining the opening 27, and the upper and lower ends 50 and 39 of the valve part 34b are aligned with the inner sidewall defining the opening 27 in the valve body 26. When the lower part 34b is aligned with the inner side wall defining the opening 27, the forces exerted against the left end of the valve means 30 by the compressed gas in the container 12 blow or force the frangible seal 42 and the valve means 30 into the diffuser tube 20, as shown in FIG. 4. This permits the compressed gas in the container 12 to flow into the diffuser tube 20. The pressurized gas flowing into the diffuser tube 20 flows therefrom through the slots 22 and into the bag 14 to cause inflation of the latter. The bag 14 when inflated extends outwardly of the dashboard 17 toward the back of the front seat of the automobile, as shown by the phantom lines in FIG. 1, and provides a cushioned restraint for protecting the occupant or occupants sitting in the front seat. To facilitate alignment of the valve part 34b with the opening 27 in the valve body 26 and to insure that the valve means 30 will be forced into the diffuser tube 20 when the valve 34 is moved to its release position, the opposite ends of the valve part 34b and the lower end 51 of the valve part 34a are rounded or beveled.

Figure 2:
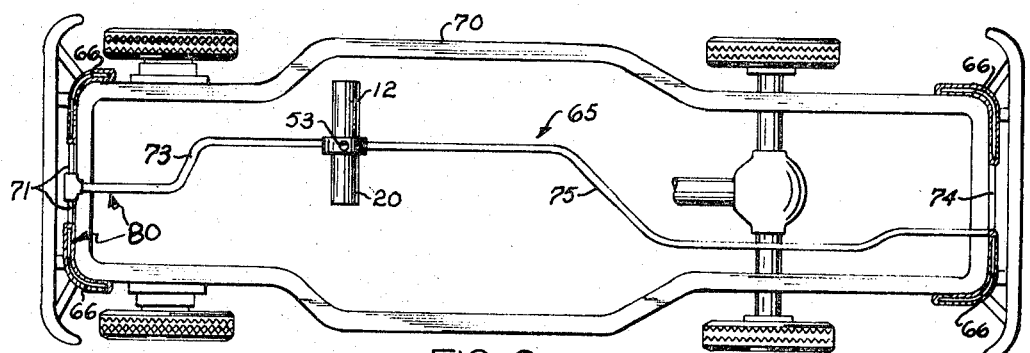
FIG. 2 is a schematic top plan view of the automobile frame and showing other parts of the safety apparatus

The valve member 34 is adapted to be actuated or moved from the normal position toward the release position by an actuating means 65 in response to the automobile 10 being subjected to a force causing a deformation thereof. The actuating means 65 comprises a plurality of crushable, generally L-shaped tubes or cylinders 66 mounted on the corners of the frame 70 of the automobile, as shown in FIG. 2. The tubes 66 are bent into an L-shape so as to have one leg thereof disposed along the side of the frame and the other leg disposed along the front or rear of the frame. The tubes 66 at the front corners of the automobile frame 70 are interconnected with each other by a conduit means 71, the conduit means 71 in turn being connected to one side of the T-shaped fitting 72 via a conduit means 73. The crushable tubes 66 at the rear corners of the automobile are interconnected with each other by a conduit means 74, the conduit 74 in turn being connected to the other side of the T-shaped fitting 72 via a conduit 75. The T-shaped fitting 72 in turn is threadably connected with the noncounterbored portion of the opening 38 in the valve body 26.

The crushable tubes 66 and the conduit means 71—75 define with the bottom 39 of the valve member 34 an enclosed container means, designated generally by reference numeral 80, for containing a suitable hydraulic fluid, preferably a liquid. The container means 80 is preferably completely filled with hydraulic fluid and with the latter being in communication with the bottom 39 of the valve member 34.

From the foregoing, it should be apparent that when the vehicle is involved in a crash or collision in which it is subjected to force causing deformation thereof and which is of sufficient magnitude to cause one of the tubes 66 to be crushed, the hydraulic fluid contained therein will be forced or moved outwardly therefrom. This movement of the fluid causes the fluid in the adjacent conduits to be moved, which in turn causes the fluid in the opening 38 to move in an upward direction and effect movement of the valve member 34 from its normal position to its release position. This path of movement is the path of movement of least resistance. The stop 53 is provided with a restricted opening 81 to permit the air in the opening 37 between the upper end of the valve member 34 and the stop 53 to escape.

When the valve member 34 is in the release position, the valve part 34b is aligned with respect to the opening 27 and pressure of the compressed gas in the container 12 causes the seal 42 and valve means 30 to be blown into the diffuser tube 20 to release the gas from the container 12 into the diffuser tube 20. The gas entering the diffuser tube 20 flows through the slots 22 and effects inflation of the bag 16 to the phantom line position so shown in FIG. 1. When the crash restraint bag 14 is inflated the occupant or occupants in the front seat are restrained so that they will not be thrown forward against the dashboard 17 and/or windshield.

It should be noted that the actuating means 65 provides for rapid actuation of the valve member to its release position upon one of the tubes being crushed, which in turn effects rapid actuation of the safety device 14. Moreover, even if the tubes 66 should break after being crushed a predetermined amount, operation of the safety device 12 is not adversely affected, since the initial crushing of the tube will cause a rapid spurt or movement of hydraulic fluid which is more than sufficient to move the valve member 34 to the release position. It should also be understood that a plurality of safety devices could be connected with the outlet end portion of the valve body 26 for simultaneous actuation when the valve member 34 is moved to its release position, or that the actuating means could be connected with a plurality of valves for controlling release of compressed gas from associated containers to associated safety devices.

Figure 5:
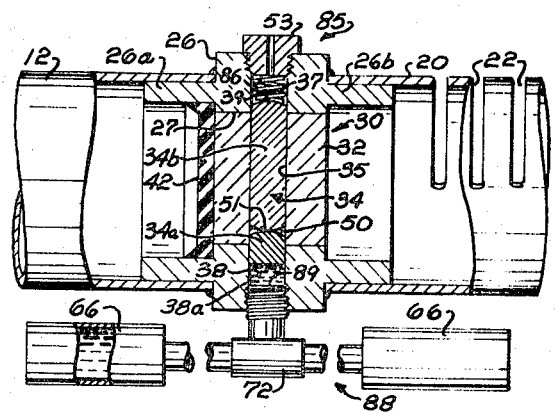
FIG. 5 is a fragmentary sectional view of a modified form of safety apparatus embodying the present invention.

In the embodiment shown in FIG. 5 the valve member 34 is spring biased in a downward direction towards its release position by a compression spring 86. The compression spring 86 has one end in abutting engagement with the stop 53 and the other end in abutting engagement with the upper end of the valve part 34a of the valve member 34.

The valve member 34 is normally maintained in the normal position, as shown in FIG. 5, in which the upper and lower end portions of the valve parts 34b and 34a are received in the openings 37 and 38 in the valve body 26 and in opposition to the biasing force of the compression spring 86 by hydraulic fluid contained in a container means 88 (shown schematically in FIG. 5). The container means 88 is of an identical construction to the container means 80, previously described, except that the crushable tubes 66 are made from a brittle or frangible material which will fracture when subjected to a crushing force exceeding a predetermined value. Thus, when the automobile is subjected to a force of a sufficient value to cause a crushing of any of the crushable tubes of the container means 88, the tube being crushed will fracture and break and thereby release the hydraulic fluid contained in the container means 88. As hydraulic fluid flows from the container means 88 and drains out of the opening 38 in the valve body 26, the compression spring 86 will move the valve member 34 downwardly to its release position in which it abuts against a stop 89. When in this position the valve part 34b will be aligned in with the sidewall defining opening 27 and the pressure of the compressed gas in the container 12 will blow the seal 42 and valve means 30 into the diffuser tube 20 and effect actuation of the safety device 12.

Figure 6:
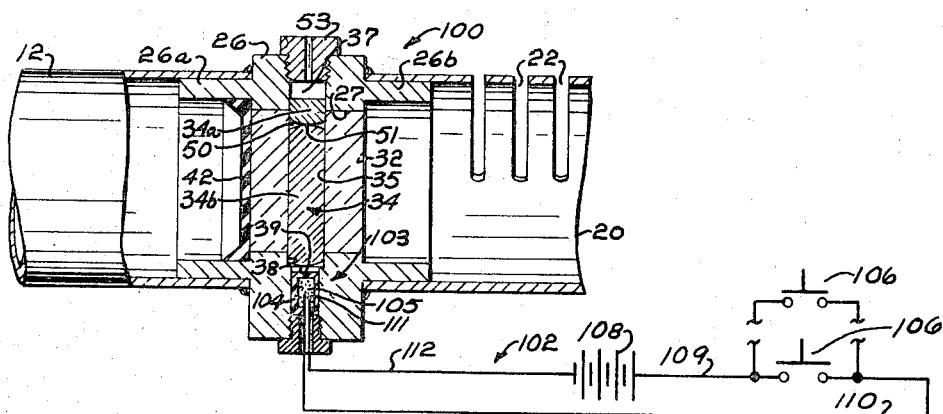
FIG. 6 is a fragmentary sectional view of a modified form of safety apparatus embodying the present invention.

As representing yet another embodiment of the present invention, FIG. 6 shows a safety apparatus 100. The safety apparatus 100 is of an identical construction to the safety apparatus 10 except that a different actuating means 102 is employed for moving the valve member 34 from its normal position to its release position to effect actuation of the safety device 12. The parts of the safety apparatus 100 corresponding to the parts of the safety apparatus 10 will be given the same reference numerals.

The actuating means 102 comprises an explosive gas generating means 103 which is adapted to be actuated or exploded to generate a gas to move the valve member 34 to its release position in response to the vehicle being subjected to a force causing deformation thereof and which is of a predetermined magnitude. The gas generating means 103 is supported by the valve body 26 adjacent the bottom 39 of the valve part 34b. The means 103 comprises a plastic enclosure 104 containing a suitable explosive substance 105 which when actuated generates a high velocity gas of sufficient pressure to move the valve member 34 from its normal position, as shown in FIG. 6, to its release position.

The explosive substance 105 is adapted to be exploded in response to closing of a suitable switch 106, preferably a crush switch, located in an electric circuit therewith. The crush switch 106 can be of any suitable or conventional construction and can be mounted on the automobile at any suitable location. Preferably, a plurality of crush switches 106 all in parallel with each other and located at the sides, rear and front of the frame of the automobile are provided.

When a crash is occurring and the vehicle is subjected to a force causing deformation thereof, one of the crush switches 106 is moved to its closed position. This completes a circuit from battery 108, wire 109, now closed crush switch 106, wire 110, detonator 111 of the gas generating means 103, wire 112 to the battery 108. The completion of this circuit actuates the detonator 111 which in turn explodes the explosive substance 105. When the substance is exploded, the plastic enclosure 104 is fractured and the gases generated by the explosion effect movement of the valve member 34 upwardly to its release position in which it effects actuation of the safety device 12, and in a manner hereinbefore described.

Figure 7:
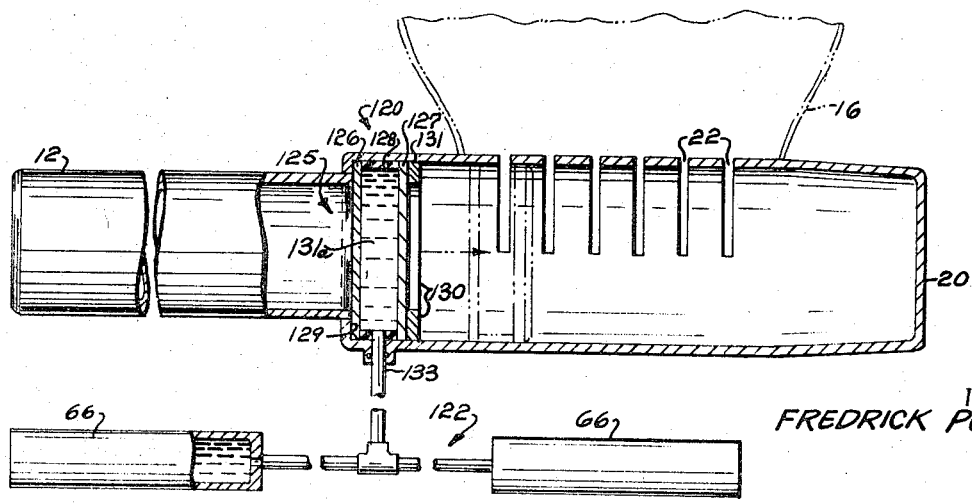
FIG. 7 is a fragmentary sectional view of a modified form of safety apparatus embodying the present invention.

As representing a still further embodiment of the present invention, FIG. 7 shows a safety apparatus 120. The safety apparatus 120 is of an identical construction to the safety apparatus 10 except that the diffuser tube 20 is directly secured to the container 12 and that a different valve assembly 125 is employed for controlling release of the compressed gas from the container 12 to the diffuser tube 20. The parts of the safety apparatus 120 corresponding to the parts of the safety apparatus 10 will be given the same reference numerals.

The valve assembly 125 is supported within the diffuser tube at the end portion thereof which is secured to the container 12. A valve assembly 125 comprises first and second spaced valve members or pistons 126, 127 slidably supported within the cylindrical diffuser tube 20. The valve members 126, 127 are separated by an annular sealing ring 128 which provides a seal between the diffuser tube 20 and the container 12 to prevent escape of the compressed gas in the container 12 through the valve assembly 125. The valve member 126 is in abutting engagement with a shoulder 129 at the left end of the diffuser tube 20, as viewed in FIG. 7, and the valve member 127 is in abutting engagement with an annular abutment ring 130 formed integral with the diffuser tube 20 adjacent the left end thereof. The annular abutment ring 130 is provided with an annular weakened or shear portion 131 at the juncture with a diffuser tube 20.

The space or chamber 131a between the valve members 126 and 127 is adapted to contain hydraulic fluid and is in communication with a container means 122 (shown schematically in FIG. 7) via an inlet connection 133. The container means 132 is of an identical construction to the container means 80 of the safety apparatus 10.

Normally the chamber 131a between the valve members 126, 127 is completely filled with hydraulic fluid. The annular abutment ring 130 is of a sufficient strength to maintain the valve assembly 125 in the solid line position shown in FIG. 7 and withstand the forces exerted at the left end of the valve member 126 by the pressurized gas in the container 12. of the hydraulic fluid in the chamber 131a plus the pressure of the compressed gas in the container 12 is sufficient to cause the abutment ring or retainer 130 to shear or rupture along the shear portion 131 whereby the entire valve assembly 125 will be blown into the diffuser tube 20. When this occurs the compressed gas in the container 12 will escape into the diffuser tube and pass through the slots 22 thereof into the bag 14 to inflate the latter.

From the foregoing, it should be apparent that the hereinbefore enumerated objects and others have been accomplished and that a new and improved safety apparatus for use in vehicles and which is of a highly simple, economical and reliable construction has been provided.

I claim:

1. Apparatus for use in a vehicle, said apparatus comprising a reservoir containing pressurized gas, a safety device which is adapted to be actuated by said gas upon being released from said reservoir, and an actuating mechanism operatively connected with said safety device and reservoir for controlling release of said gas from said reservoir, said actuating mechanism comprising valve means including a valve member movable between a first position in which the valve member is effective to prevent release of said gas from said reservoir and a second position in which the valve member effects release of said gas from said reservoir, said valve member being normally maintained said first position, and fluid container means containing hydraulic fluid, said fluid container means including a crushable portion which may be crushed to effect displacement of the hydraulic fluid in the container means when subjected to force during a vehicle crash and fluid conduit means operatively connecting said crushable portion and said valve member to effect movement of said valve member from said first position toward said second position to effect actuation of said safety device in response to displacement of the hydraulic fluid when said crushable portion of said container is crushed.

2. Apparatus as defined in claim 1 wherein said safety device includes a crash restraint bag which is adapted to be inflated by the pressurized gas in said reservoir when released by movement of said valve member.

3. Safety apparatus for protecting an occupant of a vehicle during an accident, said safety apparatus comprising a confinement expandable from a collapsed condition to an expanded condition to restrain movement of the occupant during accident, a source of fluid under pressure, valve means operable from a first condition blocking fluid flow from said source of fluid under pressure to a second condition enabling fluid to flow from said source of fluid under pressure, diffuser means for directing a flow of fluid from said source of fluid under pressure into said confinement upon operation of said valve means to said second condition, said valve means being urged toward said second condition from said first condition by pressure applied against said valve means by said source of fluid, said valve means including means for retaining said valve means against movement from said first condition to said second condition and a chamber filled with liquid, and hydraulic actuating means for effecting actuation of said retaining means independently of said source of fluid upon the occurrence of an accident, said hydraulic actuating means including crushable means filled with liquid and connected in fluid communication with said chamber for increasing the pressure in said chamber upon a crushing of said crushable means during an accident to thereby effect the application of a force to said retaining means to actuate said retaining means and enable said valve means to be operated to said second condition under the influence of the pressure applied to said valve means by said source of fluid, said valve means in said second condition enabling fluid to flow from said source of fluid through said diffuser means and into said confinement to effect expansion of said confinement from said collapsed condition.

4. Safety apparatus as set forth in claim 3 wherein said valve means includes a pair of spaced members defining said chamber, said retaining means being ruptured by the increase in fluid pressure in said chamber upon the crushing of said crushable means during an accident to thereby actuate said retaining means.

5. Apparatus for use in a vehicle, said apparatus comprising a fluid actuated safety device operable to protect an occupant of the vehicle during a crash, a source of fluid for operating said safety device, conduit means placing said source of fluid in communication with said safety device, valving means intermediate said safety device and said source, said valving means having a first condition preventing communication between said source of fluid and said safety device and a second condition in which fluid communication between said safety device and said source is effected, and fluid actuating means for effecting actuation of said valve means from said first condition to said second condition in response to said vehicle encountering a crash condition, said valve means including a pair of spaced members defining a chamber therebetween and said fluid actuating means comprising a hydraulic system including said chamber and crush cylinder the fluid pressure in said hydraulic system increasing upon crushing of said cylinder and at least one of said spaced members moving due to said increase in pressure to provide for communication between said source and said safety device.

6. Apparatus as defined in claim 5 wherein at least one of said members is engaged by abutment means which yields due to said increase in pressure to permit movement of said members.

7. Apparatus for use in a vehicle having a fluid actuated safety device operable to protect an occupant of the vehicle and a source of fluid for operating the safety device, said apparatus comprising valve means operable between closed and open conditions to control fluid flow from said source of fluid to said safety device, said valve means including releasable means for maintaining said valve means in said closed condition, and hydraulic means for effecting actuation of said releasable means independently of said source of fluid, said hydraulic means including a container means having a liquid therein and having a portion which may be crushed by the application of force thereto during a collision to effect movement of the liquid in said container means to effect actuation of said releasable means to release said valve means for operation from said closed condition to said open condition to allow fluid to flow from said source of fluid to said safety device.

8. Apparatus for use in a vehicle having a fluid actuated safety device operable to protect an occupant of the vehicle and a source of fluid for operating the safety device, said apparatus comprising valve means operable between closed and open conditions to control fluid flow from said source of fluid to said safety device, said valve means including releasable means for maintaining said valve means in said closed condition, and hydraulic means for effecting actuation of said releasable means independently of said source of fluid, said hydraulic means including a fluid container having a substantially frangible portion breakable to release fluid pressure during a crash, and means for operating said releasable means to said open condition upon release of said fluid pressure.

9. Safety apparatus for protecting an occupant of a vehicle during an accident, said safety apparatus comprising a confinement having a collapsed condition and an expended condition in which said confinement restrains movement of the occupant of the vehicle, a source of fluid for effecting expansion of said confinement, a valve assembly operatively interconnecting said confinement and said source of fluid, said valve assembly including a valve member movable from a first position blocking fluid flow between said source of fluid and said confinement to a second position enabling fluid to flow from said source of fluid into said confinement and a retainer member mounted for movement from a retaining position in which said retainer member holds said valve member against movement from said first position to said second position under the influence of pressure applied against said valve member by said source of fluid to a release position in which said valve member is fee to move to said second position under the influence of the pressure applied against said valve member by said source of fluid, and fluid actuating means for moving said retainer member from said retaining position to said release position upon the occurrence of an accident to thereby enable said valve member to move from said first position to said second position to allow fluid to flow from said source of fluid into said confinement, said fluid actuating means including a fluid container having a portion which is adapted to be crushed during a crash to effect movement of the fluid in the container to effect movement of said retained member from said retaining position to said release position.

10. A Safety apparatus for protecting an occupant of a vehicle during an accident, said safety apparatus comprising a confinement having a collapsed condition and an expanded condition in which said confinement restrains movement of the occupant of the vehicle, a source of fluid for effecting expansion of said confinement, a valve assembly operatively interconnecting said confinement and said source of fluid, said valve assembly including a valve member movable from a first position blocking fluid flow between said source of fluid and said confinement to a second position enabling fluid to flow from said source of fluid into said confinement and a retainer member mounted for movement from a retaining position in which said retainer member holds said valve member against movement from said first position to said second position under the influence of pressure applied against said valve member by said source of fluid to a release position in which said valve member is free to move to said second position under the influence of the pressure applied against said valve member by said source of fluid, a fluid actuating means for moving said retainer member from said retaining position to said release position upon the occurrence of an accident to thereby enable said valve member to move from said first position to said second position to allow fluid to flow from said source of fluid into said confinement, said fluid actuating means including a fluid container having a frangible portion adapted to break and release fluid pressure during a crash, and means for move moving said retainer member toward said release position upon release of said fluid pressure.

11. Apparatus for use in a vehicle having a fluid actuated safety device operable to protect an occupant of the vehicle and a source of fluid for operating the safety device, said apparatus comprising valve means operable between closed and open conditions to control fluid flow from said source of fluid to said safety device, said valve means including a valve member and means for retaining said valve member against movement from a first position corresponding to the closed condition of said valve means and a second position corresponding to the open condition of said valve means, and hydraulic means for rupturing said retaining means independently of said source of fluid to thereby provide for movement of said valve member from said first position to said second position.

12. Apparatus as defined in claim 11 wherein said valve means includes a pair of spaced members defining a chamber therebetween and said hydraulic means includes crushable means connected in fluid communication with said chamber for increasing the fluid pressure therein upon a crushing of said crushable means to thereby effect rupturing of said retaining means.

13. Apparatus for use in a vehicle having a fluid actuated safety device operable to protect an occupant of the vehicle and a source of fluid for operating the safety device, said apparatus comprising valve means operable between closed and open conditions to control fluid flow from said source of fluid to said safety device, said valve means including a valve member and means for retaining said valve member against movement from a first position corresponding to the closed condition of said valve means to a second position corresponding to the open condition of said valve means, and hydraulic means for effecting actuation of said retaining means independently of said source of fluid to thereby provide for movement of said valve member from said first position to said second position, said hydraulic means including means for applying pressure against said valve means and for decreasing the pressure applied against said valve means during an accident to thereby a effect actuation of said retaining means.

14. Apparatus as set forth in claim 13 wherein said means for applying pressure includes container means having a liquid therein and having a portion which may be broken by the application of force thereto during a collision to effect the aforesaid decrease in the pressure applied against said valve means.

15. Apparatus for use in a vehicle having a fluid actuated safety device operable to protect an occupant of the vehicle and a source of fluid for operating the safety device, said apparatus comprising valve means operable between closed and open conditions to control fluid flow from said source of fluid to said safety device, said valve means further includes a valve member and means for retaining said valve member against movement from a first position corresponding to the closed condition of said valve means to a second position corresponding to the open condition of said valve means, and hydraulic means for effecting actuation of said retaining means independently of said source of fluid to thereby provide for movement of said valve member from said first position to said second position, said valve means further including a liquid filled chamber which is connected in fluid communication with said hydraulic means, said hydraulic means being operable to vary the pressure in said liquid filled chamber during an accident to thereby actuate said retaining means and provide for the aforesaid movement of said valve member from said first position to said second position.

16. Apparatus as defined in claim 15 wherein said source of fluid is operable to apply pressure against said valve member to move said valve member from said first position to said second position in a substantially intact condition upon actuation of said retaining means by said hydraulic means.

17. Apparatus for use in a vehicle, said apparatus comprising a fluid actuated safety device operable to protect an occupant of the vehicle during an accident, a source of fluid for operating said safety device, valve means operable from a first condition blocking fluid flow from said source of fluid to said safety device to a second condition enabling fluid to flow from said source of fluid to said safety device, said valve means being urged toward said second condition from said first condition by pressure applied against said valve means by said source of fluid, said valve means including means for retaining said valve means against movement from said first condition to said second condition, and fluid actuating means for subjecting said retaining means to a change in pressure in a direction transverse to the direction of the pressure applied to said valve means by said source of fluid to thereby effect actuation of said retaining means from an engaged condition to a disengaged condition to enable said valve means to be operated to said second condition under the influence of the pressure applied to said valve means by said source of fluid, said fluid actuating means including a fluid container having a fluid therein and having a portion adapted to be crushed during a collision to subject said retaining means to an increase in pressure in the transverse direction to thereby effect actuation of said retaining means from said engaged condition to said disengaged condition.

18. Apparatus for use in a vehicle, said apparatus comprising a fluid actuated safety device operable to protect an occupant of the vehicle during an accident, a source of fluid for operating said safety device, valve means operable from a first condition blocking fluid flow from said source of fluid to said safety device to a second condition enabling fluid to flow from said source of fluid to said safety device, said valve means being urged toward said second condition from said first condition by pressure applied against said valve means by said source of fluid, said valve means including means for retaining said valve means against movement from said first condition to said second condition, and fluid actuating means for subjecting said retaining means to a change in pressure in a direction transverse to the direction of the pressure applied to said valve means by said source of fluid to thereby effect actuation of said retaining means from an engaged condition to a disengaged condition to enable said valve means to be operated to said second condition under the influence of the pressure applied to said valve means by said source of fluid, said fluid actuating means includes a fluid container having a fluid therein and having a portion adapted to be crushed to release fluid during a collision and subject said retaining means to a decrease in pressure in the transverse direction to thereby effect actuation of said retaining means from said engaged condition to said disengaged condition.

19. Apparatus for use in a vehicle having a fluid actuated safety device operable to protect an occupant of the vehicle and a source of fluid for operating said safety device, said apparatus comprising valve means operable between closed and open conditions to control fluid flow from said source of fluid to said safety device, container means having a liquid therein and having a portion which may be crushed during a collision to effect movement of the liquid in said container means, and means for enabling said valve means to be operated from said closed condition to said open condition in response to movement of the liquid in said container means upon a crushing of said portion of said container means to thereby enable fluid to flow from said source of fluid to said safety device.

20. Apparatus for use in a vehicle having a fluid actuated safety device operable to protect an occupant of the vehicle and a source of fluid for operating said safety device, said apparatus comprising valve means operable between closed and open conditions to control fluid flow from said source of fluid to said safety device, container means having a liquid therein and having a frangible portion which may be broken during a collision to release the liquid in said container means, and means for enabling said valve means to be operated from said closed condition to said open condition in response to releasing of the liquid in said container means upon a breaking of said frangible portion of said container means to thereby enable fluid to flow from said source of fluid to said safety device.

21. Safety apparatus for protecting an a occupant of a vehicle during an accident, said safety apparatus comprising a confinement having a collapsed condition and an expanded condition in which said confinement restrains movement of the occupant of the vehicle, a source of fluid for effecting expansion of said confinement, a valve assembly operatively interconnecting said confinement and said source of fluid, said valve assembly including a valve body, a valve member movable from a first position blocking within said valve body fluid flow between said source of fluid and said confinement to a second position enabling fluid to flow from said source of fluid into said confinement, and a retainer member mounted for sliding movement relative to said valve member and said valve body from a retaining position in which said retainer member engages said valve body and holds said valve member against movement from said first position to said second position under the influence of pressure applied against said valve member by said source of fluid to a release position in which said retainer member is disengaged from said valve body and said valve member is free to move to said second position under the influence of the pressure applied against said valve member by said source of fluid, and fluid actuating means for moving said retainer member from said retaining position to said release position upon the occurrence of an accident to thereby enable said valve member to move from said first position to said second position to allow fluid to flow from said source of fluid into said confinement.

22. Apparatus as defined in claim 21 wherein said fluid actuating means comprises an explosive charge disposed in said valve body adjacent said retainer member and means for exploding said charge to generate a gas to move said retainer member from said retaining position in which said retainer member engages said valve body to said release position in which said retainer member is disengaged from said valve body.

23. Apparatus for use in a vehicle, said apparatus comprising fluid actuated safety device operable to protect an occupant of the vehicle during an accident, a source of fluid for operating said safety device, valve means operable from a first condition blocking fluid flow from said source of fluid to said safety device to a second condition enabling fluid to flow from said source of fluid to said safety device, said valve means being urged toward said second condition from said first condition by pressure applied against said valve means by said source of fluid, said valve means including a valve body defining an opening connecting said source of fluid in fluid communication with said safety apparatus when said valve means is in said second condition, a valve member movable from a first position blocking the opening in said valve body to a second position enabling fluid to flow through the opening in said valve body, a retainer member slidably mounted in an opening in said valve member for movement between a retaining position engaging said valve body to hold said valve member against movement from the first position to the second position and a release position disengaged from said valve body to enable said valve member to move to the second position, said retainer member being movable with said valve member to the second position upon movement of said valve member to the second position, and fluid actuating means for subjecting said retainer member to a change in pressure in a direction transverse to the direction of the pressure applied to said valve means by said source of fluid to thereby effect actuation of said retainer member from the retaining position to the release position in which said retainer member is disengaged from said valve body to enable said valve body to enable said valve member and retainer member to be moved together to the second position under the influence of the pressure applied to said valve member by said source of fluid.

24. Apparatus as set forth in claim 23 wherein said fluid actuating means comprises an explosive charge disposed adjacent to said retainer member and means for exploding said charge to generate a gas which subjects said retainer member to an increase in pressure in the transverse direction to thereby effect actuation of said retainer member from the retaining position to the release position.

25. Apparatus for use in a vehicle having a fluid actuated safety device operable to protect an occupant of the vehicle and a source of fluid for operating said safety device, said apparatus comprising valve means operable between closed and open conditions to control fluid flow from said source of fluid to said safety device, said valve means including a valve body defining an opening for connecting said source of fluid in fluid communication with said safety apparatus when said valve means is in the open condition, a pair of walls defining a fluid chamber therebetween, said walls being movable from a first position blocking fluid flow through the opening and to a second position enabling fluid to flow through the opening, and retainer means for retaining said walls in the first position, said apparatus further including means for increasing fluid pressure in said fluid chamber defined by said walls in response to the vehicle encountering an accident to release said retainer means and thereby enable said walls to move from the first position blocking fluid flow through the opening to the second position enabling fluid to flow through the opening from said source of fluid to said safety apparatus.